(No Model.)

H. H. UNZ.
WASHER.

No. 554,099. Patented Feb. 4, 1896.

WITNESSES:
Frank S Busser
James H. Shields

INVENTOR
H. H. Unz
by his Atty
J H Harding

UNITED STATES PATENT OFFICE.

HENRY H. UNZ, OF PHILADELPHIA, PENNSYLVANIA.

WASHER.

SPECIFICATION forming part of Letters Patent No. 554,099, dated February 4, 1896.

Application filed February 11, 1890. Serial No. 340,054. (No model.)

*To all whom it may concern:*

Be it known that I, HENRY H. UNZ, a citizen of the United States, residing at Philadelphia, county of Philadelphia, and State of Pennsylvania, have invented a new and useful Improvement in Washers, of which the following is a full, clear, and exact description, reference being had to the accompanying drawings, which form a part of this specification.

My invention has for its object to provide a secure and firm washer.

My improvement will be described in reference to its use with type-writers, although it is obvious that is use need not be limited to that purpose.

Figure 1:
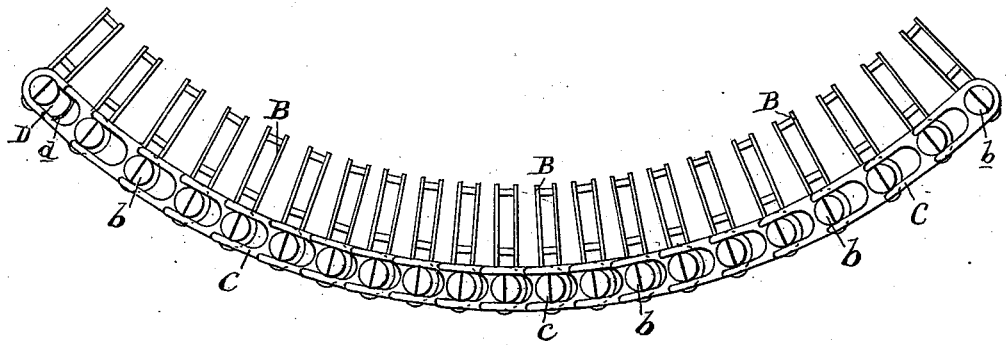
Figure 2:
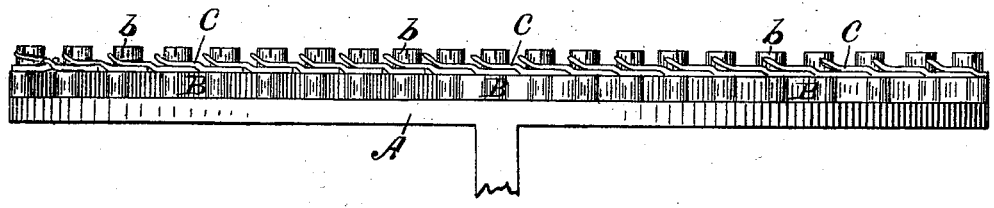
Figures 3, 4, 9:
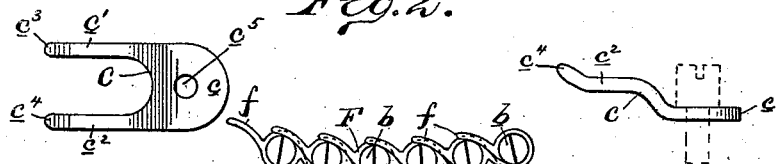
Figures 5, 6, 8:
Figure 7:
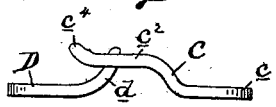

In the drawings, Figure 1 represents a plan view of a segment of circle, showing type-bar hangers and retaining-screws and improved washer. Fig. 2 is a side view in perspective of Fig. 1. Fig. 3 is an enlarged top view of washer. Fig. 4 is a side view of Fig. 3, dotted line showing screw. Fig. 5 is an enlarged view of washer used for last hanger. Fig. 6 is a side view of Fig. 5. Fig. 7 shows the combined use of washer shown in Fig. 5 with washer shown in Fig. 3. Fig. 8 is a view of modified form of washer. Fig. 9 is a plan view showing modified washer in operation.

A is the frame of the machine type-writer, to which are secured the type-bar hangers B by means of a screw $b$ passing through said hanger into the frame.

C is a washer. This washer is shown in detail in Figs. 3 and 4. It consists of the bearing-surface $c$, the jaws $c'$ $c^2$ projecting from and integral with said bearing-surface $c$. These jaws are turned up from the bearing-surface $c$, so as to be higher than said surface. The ends of these jaws $c'$ $c^2$ are turned up, as shown ($c^3$ $c^4$) in Figs. 3 and 4.

$c^5$ is the orifice in the bearing-surface $c$ of the washer, through which the screw $b$ passes.

These washers, as shown in Figs. 1 and 2, are so arranged with reference to each other that the jaws of one washer overlap the next washer, the main portion $c'$ $c^2$ of the jaws of one washer resting upon the bearing-surface of the next washer, the screw of said second washer projecting between the jaws of the first washer. The ends of the jaws $c'$ $c^2$ are turned up when the bearing-surfaces are close to each other, as in the center of Figs. 1 and 2, because if the jaws of the washer were not turned up they would be so long that they would extend beyond the screw of the next washer and would come in contact with the bearing-surface of the washer, and thus act as a spring and prevent the screw which said washer acts upon from being well seated. This could be accomplished by varying the lengths of the jaws. The last hanger of the series is provided with a washer, as shown in Figs. 5 and 6, which consists of the bearing-surface D and the raised portion $d$, the width of the raised portion being equal to or slightly in excess of the space between the jaws $c'$ $c^2$ of the preceding washer. This washer D is placed as shown in Figs. 1 and 2, left-hand end, and its raised portion $d$ rests between the jaws $c'$ $c^2$ of the preceding washer and locks it firmly.

Although I have shown my washer with the jaws higher than the bearing-surface, they can be on the same level without departing from my invention, and the ends of the jaws can be left without turning up without departing from my invention.

In Figs. 8 and 9 is shown a modification, in which there are projections $f$ $f'$ in opposite directions from the bearing-surface F, the screw being held firmly by one projection from the preceding and one projection from the following washer, as shown in Fig. 9.

Having now fully described my invention, what I claim, and desire to protect by Letters Patent, is—

1. In combination with adjacent screws or bolts, of washers each provided with a bearing-surface, an orifice in said bearing-surface through which the screw or bolt passes, and jaws projecting from said bearing-surface, the space between the jaws being approximately equal to the diameter of the screw or bolt, and the screw resting between the jaws of the washer adjacent to the one through which it passes.

2. The combination with adjacent screws or bolts of washers, each provided with a bearing-surface, an orifice in said bearing-surface through which the screw or bolt passes, and jaws projecting from and higher than said bearing-surface, the space between the jaws being approximately equal to the diameter of the screw or bolt, and the screw resting between the jaws of the washer adjacent to the one through which it passes.

3. In combination with a washer provided with a bearing-surface and an orifice in said bearing-surface, and jaws projecting from said bearing-surface, of a locking device independent of the device secured by the washer and of approximately the size of the space between the jaws, and resting between said jaws.

4. The combination with a washer provided with a bearing-surface and an orifice in said bearing-surface, and jaws projecting from and higher than said bearing-surface, of a locking device independent of the device secured by the washer and of approximately the size of the space between the jaws and resting between said jaws.

5. An improved washer which consists of a bearing-surface provided with an orifice and jaws projecting from said bearing-surface, the ends of said jaws being bent upward.

6. An improved washer which consists of a bearing-surface provided with an orifice, and jaws projecting from and higher than said bearing-surface, the ends of said jaws being bent upward.

7. The combination of a washer which consists of a bearing-surface provided with an orifice and jaws projecting from said bearing-surface, with a washer which consists of a bearing-surface provided with an orifice and a raised portion, the width of which is substantially that of the space between the jaws of the first washer.

8. The combination of a washer which consists of a bearing-surface provided with an orifice, and jaws projecting from and higher than said bearing-surface, with a washer which consists of a bearing-surface provided with an orifice and a raised portion the width of which is substantially that of the space between the jaws of the first washer.

In testimony of which invention I have hereunto set my hand.

HENRY H. UNZ.

Witnesses:
LEWIS R. DICK,
FRANK S. BUSSER.